(No Model.)
T. H. PAESSLER.
TRICYCLE.
No. 311,084. Patented Jan. 20, 1885.
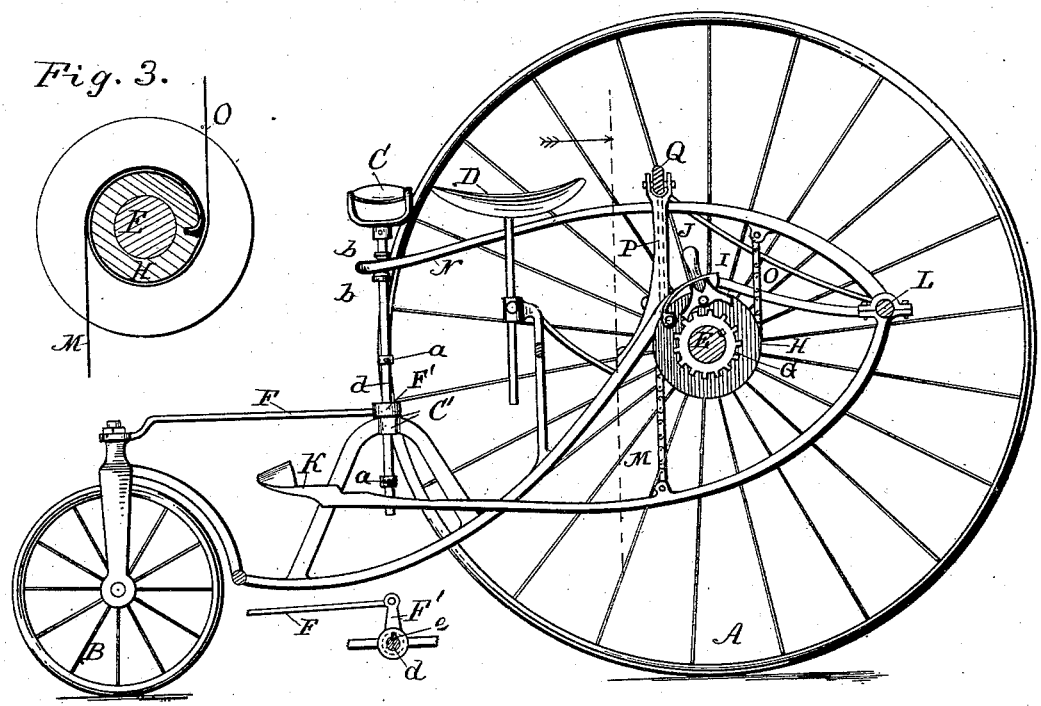
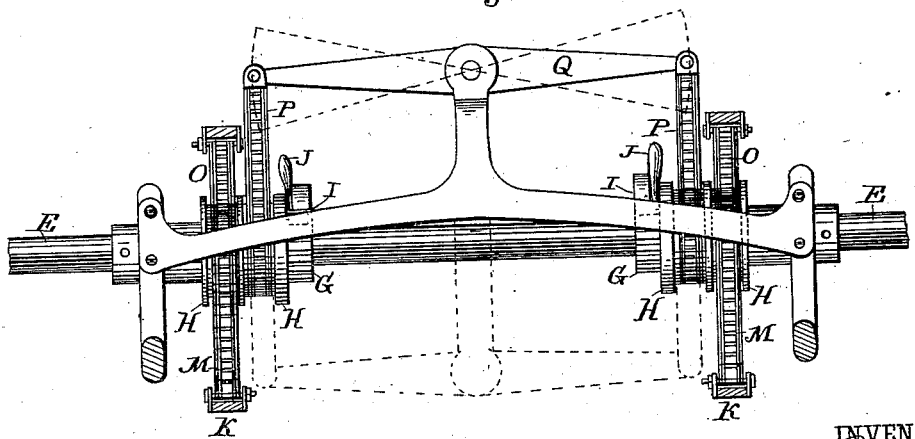
WITNESSES:
Thos. Houghton.
W. K. Stevens.
INVENTOR:
T. H. Paessler
BY Munn & Co
ATTORNEYS.

UNITED STATES PATENT OFFICE.

THEOPHILUS H. PAESSLER, OF MALVERN, OHIO.

TRICYCLE.

SPECIFICATION forming part of Letters Patent No. 311,084, dated January 20, 1885.

Application filed September 11, 1884. (No model.)

*To all whom it may concern:*

Be it known that I, THEOPHILUS H. PAESSLER, a citizen of the United States, residing at Malvern, in the county of Carroll and State of Ohio, have invented certain new and useful Improvements in Tricycles, of which the following is a description.

This invention relates to propelling that class of velocipedes called "tricycles;" and it has for its object to apply a man's power to greater advantage than has heretofore been done, and to utilize his weight in addition to the power of both his legs and arms.

To this end my invention consists in the construction and combination of parts forming the propelling mechanism of a tricycle, hereinafter described and claimed, reference being had to the accompanying drawings, in which—

Figure 1 is a longitudinal sectional elevation of a tricycle, showing my invention. Fig. 2 is a plan view of a portion of the same, in the region of the axle; and Fig. 3 is a section of the axle and a spool, showing how two belts or chains wind thereon.

A represents one of two drive-wheels, which are fixed to the shaft E to be revolved thereby.

B is the guide-wheel, and C the guiding-handle, connected therewith in any usual manner, such as by lateral arms and a connecting-rod, F.

D is the saddle or rider's seat, secured to the frame in any usual manner.

G represents two ratchet-wheels, keyed to the shaft E.

H represents two double spools, fitted loosely on the shaft E, and connected therewith by means of a spring-pawl, L, pivoted on the spool to engage the ratchet-wheel $g$.

J is a handle to the pawl, by which it may be set entirely free from the ratchet, so that the machine may be run either forward or backward independent thereof; or it may be set to engage the ratchet to carry the latter either forward or backward.

K is one of a pair of treadles or foot-levers, pivoted at L, and connected with one of the spools H by means of a belt or chain, M, adapted to wind thereon.

N is one of a pair of hand-levers, also pivoted at L, and connected with one of the same spools H by means of a belt or chain, O, but winding on the opposite side to the chain M.

P is another belt or chain, winding onto a portion of each spool H in a direction opposite to the chains M and O.

Q is a walking-beam connecting the two chains P across the machine parallel with the axle E.

The operation is as follows: One treadle K, being borne down, pulls on the chain M, revolving the spool H, causing the pawl L to take into the ratchet G, thereby revolving the axle E and wheels A, and, winding on one of the chains P, causes the walking-beam Q to draw off the other chain P, thus turning the spool to which it is attached to wind up its belt M, thereby lifting the opposite treadle, so that bearing down either treadle raises the other by the action of the walking-beam. Motion may be imparted to the treadles by shifting the rider's weight from one foot to the other. Now, if there be freed handles C, the rider may pull thereon and add to the power applied to the treadles, and by means of my hand-levers N, hung to operate the same spools in the same direction with the treadles while the said levers themselves move in the opposite direction—that is, upward when the treadle moves downward—double power is applied to propelling the wheels.

A novel feature of my construction is that the pawl I may be disengaged from the ratchet G; the spool H be rolled over by hand, so as to start all three chains, M O P, to winding in the opposite direction; then set the pawl to act backward, and the regular operation of treadles and levers will run the machine backward. Of course the ratchets G might be connected with the wheels independent of the axle. The chains M and O should be attached to their levers directly below and above the axle E, but they are not so shown.

The joint at C′ consists of an arm, F′, journaled in the frame of the machine by means of a hollow bearing through which the vertical shaft $d$ of the handle C is free to slide, but in which the shaft is engaged from turning by a spline, $e$. The guiding-handle C is thus enabled to turn the arm F′, while it is free to play vertically. The handle C is connected with one of the levers N by a loose joint having semi-spherical shoulders $b$, permitting the lever to vibrate and the handle-shaft to turn in it. Thus the lever may be worked by the handle at the same time the handle may be turned from side to side to guide the guide-wheel. *a a* are blocks secured on the shaft *d*, to prevent too much motion thereof.

What I claim as my invention, and desire to secure by Letters Patent, is—

1. The combination, with the guiding-wheel, a lever therefor, and a lever attached to revolve the drive-wheel of a velocipede, of a handle provided with a vertical shaft passing loosely through the said lever to revolve therein, and having shoulders above and below the lever to engage and operate the same, the said vertical shaft being fitted to pass to and fro freely through the wheel-guiding lever, and engaged to revolve the same by a spline, substantially as shown and described, whereby the same handle may operate both the driving-lever and the guide-wheel, as specified.

2. The combination, with two drive-wheels, A, of a velocipede mounted on an axle, and a ratchet-wheel, G, secured to revolve with each of a pair of double spools H, mounted to turn on the axle, spring-pawls adapted to engage the spools with the ratchet-wheels, treadles K, pivoted at L, and straps or chains M, connecting the said treadle with the said spools at one side of each spool, levers N, also pivoted at L, and straps or chains O, connecting levers N with the spools H on the side opposite to the chains M. a walking-beam, Q, pivoted in a plane parallel with the axle, and chains P, connecting the walking-beam with the spools H in a direction opposite to the chains M and O, substantially as shown and described.

3. The combination, with the drive-wheel and axle of a velocipede, and a ratchet-wheel secured thereto, of a lever, a spool on the axle, a strap or chain connecting the treadle with the spool, to be wound either way on the latter, and a reversible pawl adapted to connect the spool with the ratchet, to turn the latter either forward or backward by the action of the lever, as shown and described.

THEOPHILUS H. PAESSLER.

Witnesses:
W. X. STEVENS,
SOLON C. KEMON.